United States Patent
Chembrolu et al.

(10) Patent No.: US 9,129,619 B2
(45) Date of Patent: Sep. 8, 2015

(54) PARTIAL MAIN POLE LAMINATION FOR POLE ERASURE IMPROVEMENT

(71) Applicant: HGST Netherlands B.V., Amsterdam (NL)

(72) Inventors: Venkatesh Chembrolu, San Jose, CA (US); Wen-Chien David Hsiao, San Jose, CA (US); Alexander M. Zeltser, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/165,052

(22) Filed: Jan. 27, 2014

(65) Prior Publication Data

US 2015/0213814 A1     Jul. 30, 2015

(51) Int. Cl.
*G11B 5/127*     (2006.01)
*G11B 5/147*     (2006.01)

(52) U.S. Cl.
CPC .............. *G11B 5/147* (2013.01); *G11B 5/1278* (2013.01)

(58) Field of Classification Search
CPC .... G11B 5/1278; G11B 5/147; G11B 5/1875; G11B 5/1877
USPC ............. 360/125.04, 125.06, 125.08, 125.11, 360/125.12, 125.15
See application file for complete search history.

(56) References Cited

U.S. PATENT DOCUMENTS

| | | | |
|---|---|---|---|
| 6,721,131 B2 | 4/2004 | Litvinov et al. | |
| 6,771,464 B2 | 8/2004 | Minor | |
| 6,975,486 B2 | 12/2005 | Chen et al. | |
| 7,221,538 B2 * | 5/2007 | Kawato et al. | 360/125.04 |
| 7,436,629 B2 * | 10/2008 | Freitag et al. | 360/125.12 |
| 7,532,433 B2 * | 5/2009 | Kawato et al. | 360/125.08 |
| 7,554,765 B2 * | 6/2009 | Shukh et al. | 360/125.12 |
| 8,139,321 B2 | 3/2012 | Zeltser et al. | |
| 8,310,787 B1 | 11/2012 | Sasaki et al. | |
| 8,320,078 B1 * | 11/2012 | Zeltser et al. | 360/125.12 |
| 8,446,692 B2 * | 5/2013 | Zhou et al. | 360/125.31 |
| 8,451,560 B2 | 5/2013 | Hong et al. | |
| 8,468,683 B2 | 6/2013 | Mao et al. | |
| 8,559,132 B2 * | 10/2013 | Takano et al. | 360/125.12 |
| 8,881,376 B2 * | 11/2014 | Zhou et al. | 29/603.07 |
| 2008/0291571 A1 | 11/2008 | Miyake et al. | |
| 2009/0073608 A1 * | 3/2009 | Ookawa et al. | 360/125.03 |
| 2011/0249365 A1 * | 10/2011 | Zeltser et al. | 360/244 |

OTHER PUBLICATIONS

Heinonen, Ollie; "Disk Drives—The Challenge of Shrinking Heads"; Seagate Technology; Jan. 2006; 86 pages.

* cited by examiner

*Primary Examiner* — Will J Klimowicz
(74) *Attorney, Agent, or Firm* — Patterson & Sheridan, LLP (57) ABSTRACT

The embodiments of the present invention relate to a magnetic write head and a method for forming the magnetic write head. The magnetic write head includes a partially laminated main pole that has a magnetic layer that is recessed from a media facing surface, a nonmagnetic spacer layer disposed on and adjacent to the magnetic layer and a laminated stack disposed on at least a portion of the nonmagnetic layer. The nonmagnetic spacer layer has a first end at the media facing surface and a second end at a distance from the media facing surface and the laminated stack has a first end at the media facing surface and as second end at a distance from the media facing surface.

20 Claims, 7 Drawing Sheets

PARTIAL MAIN POLE LAMINATION FOR POLE ERASURE IMPROVEMENT

BACKGROUND

1. Field

Embodiments of the present invention generally relate to a magnetic write head for use in a hard disk drive.

2. Description of the Related Art

The heart of a computer is a magnetic disk drive which typically includes a rotating magnetic media, such as a disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent a media facing surface, such as an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

To write data to the magnetic disk, an electrical current is caused to flow through a conductive coil in the write head to induce a magnetic field across the gap between the main and return poles of the magnetic write head. By reversing the polarity of the current through the coil, the polarity of the data written to the magnetic media is also reversed.

The main pole is generally made of a soft magnetic material that becomes magnetized in a direction perpendicular to the ABS, and generates a magnetic field in the media during recording when the current is applied to the coil. The residual magnetic moment of the main pole when the main pole does not have a write current field from the conductive coil should be close to zero, and the easy axis of the main pole should be oriented along an easy axis parallel to the ABS. When the magnetic moment does not return to an orientation parallel to the ABS, the main pole has a remnant moment with a component perpendicular to the ABS. This remnant magnetic field of the main pole may deteriorate or even erase data from the magnetic medium. To minimize the data erasure, the main pole may be a laminated stack of high moment magnetic layers separated by thin nonmagnetic layers with each layer of the laminated stack forming a part of the main pole at the ABS. However, laminated main pole is known to require higher current to energize and also results in less output compared to an un-laminated main pole.

Therefore, an improved magnetic write head is needed.

SUMMARY OF THE INVENTION

The embodiments of the present invention relate to a magnetic write head and a method for forming the magnetic write head. The magnetic write head includes a partially laminated main pole that has a magnetic layer that is recessed from a media facing surface, a nonmagnetic spacer layer disposed on and adjacent to the magnetic layer and a laminated stack disposed on at least a portion of the nonmagnetic layer. The nonmagnetic spacer layer has a first end at the media facing surface and a second end at a distance from the media facing surface and the laminated stack has a first end at the media facing surface and as second end at a distance from the media facing surface.

In one embodiment, a magnetic write head is disclosed. The magnetic write head comprises a partially laminated main pole that includes a magnetic layer having a first end at a first distance from a media facing surface and a second end at a second distance from the media facing surface, and a nonmagnetic layer disposed on and adjacent to the magnetic layer. The nonmagnetic layer has a third end at the media facing surface and a fourth end at a third distance from the media facing surface. The magnetic write head further comprises a laminated stack disposed on at least a portion of the nonmagnetic layer and the laminated stack has a fifth end at the media facing surface and a sixth end at a fourth distance from the media facing surface.

In another embodiment, a magnetic write head is disclosed. The magnetic write head comprises a partially laminated main pole that includes a first magnetic layer having a first end at a media facing surface and a second end at a first distance from the media facing surface, and a nonmagnetic layer disposed on a first portion of the first magnetic layer. The nonmagnetic layer has a third end at the media facing surface and a fourth end at a second distance from the media facing surface. The magnetic write head further comprises a second magnetic layer disposed on the nonmagnetic layer and a second portion of the first magnetic layer, and the second magnetic layer has a fifth end at the media facing surface and a sixth end at a third distance from the media facing surface. The second distance is less than the first distance and the third distance.

In another embodiment, a method for forming a magnetic write head is disclosed. The method comprises depositing a magnetic layer on a substrate, the magnetic layer has a first end at a first distance from a media facing surface and a second end at a second distance from the media facing surface, and depositing a nonmagnetic layer on and adjacent to the magnetic layer. The nonmagnetic layer has a third end at the media facing surface and a fourth end at a third distance from the media facing surface. The method further comprises depositing a laminated stack on the nonmagnetic layer, and the laminated stack has a fifth end at the media facing surface and a sixth end at a fourth distance from the media facing surface.

In another embodiment, a method for forming a magnetic write head is disclosed. The method comprises depositing a first magnetic layer on a substrate, wherein the first magnetic layer has a first end at a media facing surface and a second end at a first distance from the media facing surface, and depositing a nonmagnetic layer on the first magnetic layer. The nonmagnetic layer has a third end at the media facing surface and a fourth end at a second distance from the media facing surface. The method further comprises removing a first portion of the nonmagnetic layer, where a remaining second portion of the nonmagnetic layer extends to the media facing surface and covers a first portion of the first magnetic layer, and depositing a second magnetic layer on the second portion of the nonmagnetic layer and a second portion of the first magnetic layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments of the present invention relate to a magnetic write head and a method for forming the magnetic write head. The magnetic write head includes a partially laminated main pole that has a magnetic layer that is recessed from a media facing surface, a nonmagnetic spacer layer disposed on and adjacent to the magnetic layer and a laminated stack disposed on at least a portion of the nonmagnetic layer. The nonmagnetic spacer layer has a first end at the media facing surface and a second end at a distance from the media facing surface and the laminated stack has a first end at the media facing surface and as second end at a distance from the media facing surface.

Figure 1:
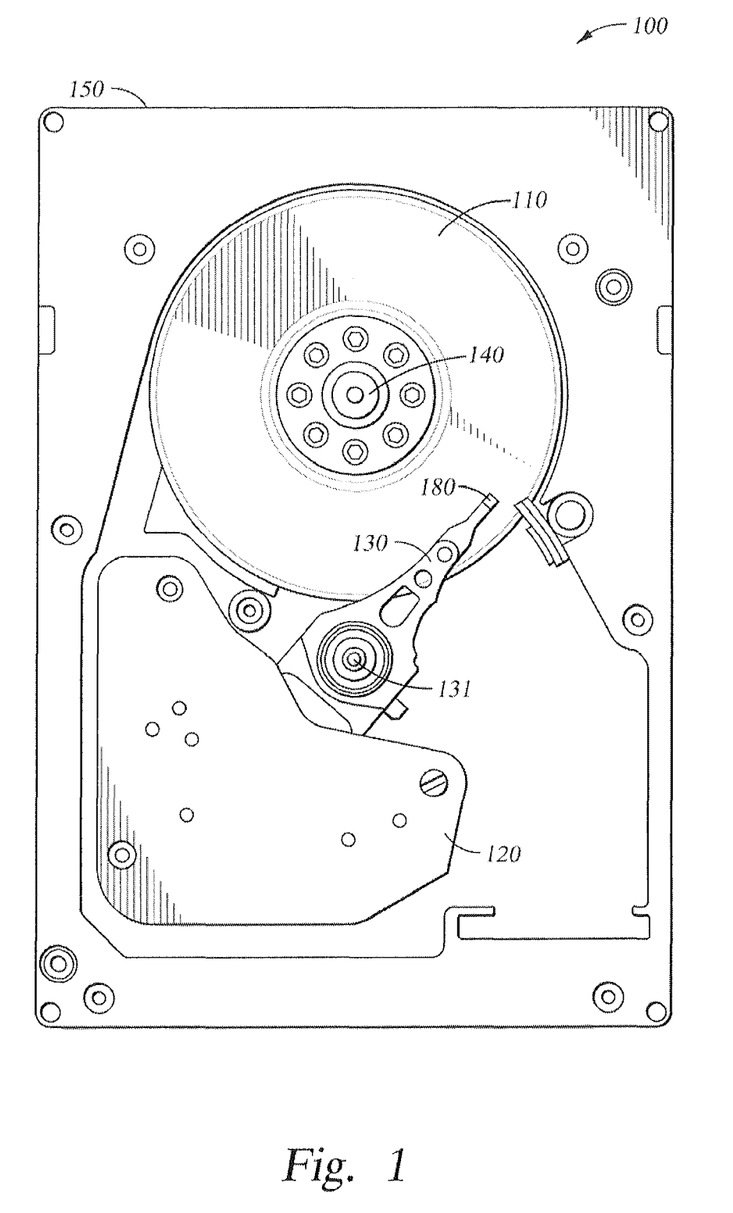
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic media, or disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
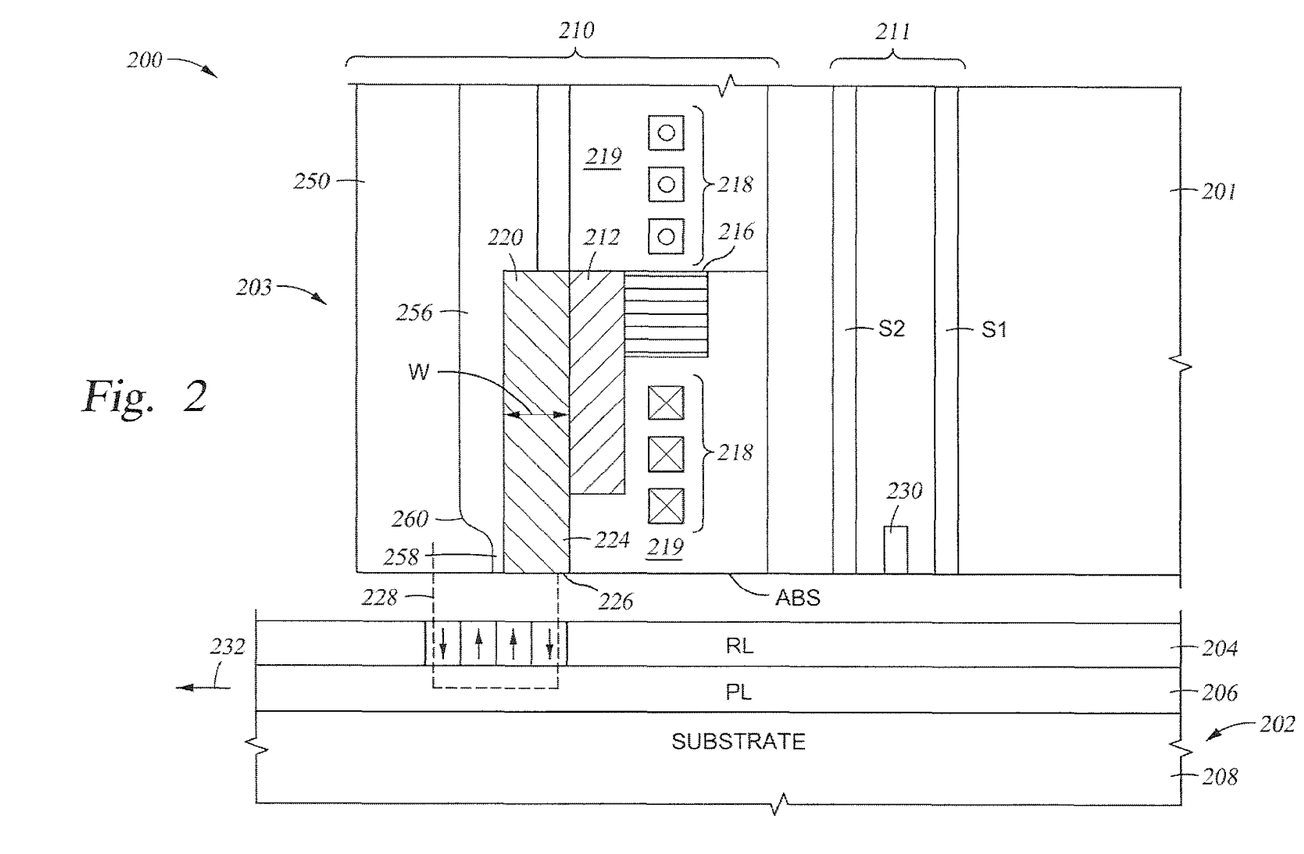
FIG. 2 is a side view of a read/write head and magnetic disk of the disk drive of FIG. 1, according to one embodiment of the invention.

FIG. 2 is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes a media facing surface, such as an ABS, a magnetic write head 210 and a magnetic read head 211, and is mounted such that the ABS is facing the magnetic disk 202. In FIG. 2, the disk 202 moves past the write head 210 in the direction indicated by the arrow 232, so the portion of slider 201 that supports the read/write head 200 is often called the slider "trailing" end 203.

The magnetic read head 211 is a magneto-resistive (MR) read head that includes a MR sensing element 230 located between MR shields S1 and S2, which are composed of a highly permeable and magnetically soft material such as permalloy. The distance between S1 and S2, which is the sensor thickness, defines the read gap of the read head. The MR sensing element 230 may be one or more side by side sensors which are described in detail below. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a pole 212 and a yoke 216. The write head 210 also includes a thin film coil 218 shown in the section embedded in nonmagnetic material 219 and wrapped around yoke 216. In an alternative embodiment, the yoke 216 may be omitted, and the coil 218 may wrap around the pole 212. A main pole 220 is magnetically connected to the pole 212 and includes a tip 224 that has an end 226 that defines part of the ABS of the magnetic write head 210 facing the outer surface of disk 202. The main pole 220 may have a width "W" between about 120 nm and 350 nm.

In operation, write current passes through coil 218 and induces a magnetic field (shown by dashed line 228) from the main pole 220 that passes through the RL 204 (to magnetize the region of the RL 204 beneath the main pole 220), through the flux return path provided by the PL 206, and back to an upper return pole 250. In one embodiment, the greater the magnetic flux of the main pole 220, the greater is the probability of accurately writing to desirable regions of the RL 204.

FIG. 2 further illustrates one embodiment of the upper return pole or magnetic shield 250 that is separated from main pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the main pole 220. As FIG. 2 is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the main pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the main pole 220, while avoiding saturation of the shield 250.

It should be understood that the taper 260 may extend either more or less than is shown in FIG. 2. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a final thickness at a second distance (greater than the first distance) from the ABS.

Figure 3A:
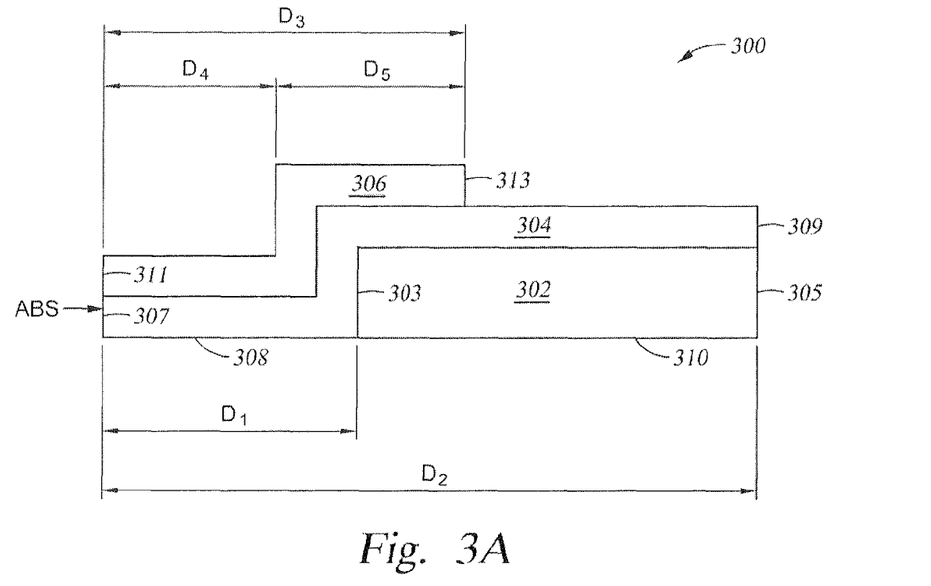
FIGS. 3A-3B show a main pole of the write head according to one embodiment.
Figure 4:
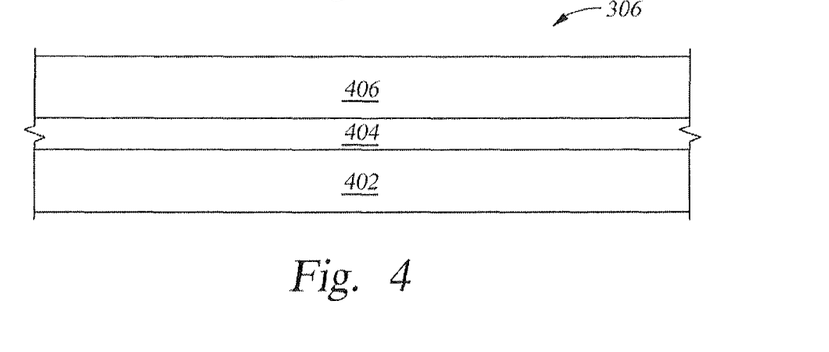
FIG. 4 illustrate a laminated stack according to one embodiment.

FIG. 3A is a cross sectional side view of a main pole 300 according to one embodiment. The main pole 300 may be the main pole 220 in FIG. 2. The main pole 300 has a magnetic layer 302 that has a first end 303 that is a distance "D1" from the ABS and a second end 305 that is a distance "D2" from the ABS. In one embodiment, the distance "D1" ranges from about 100 nanometers (nm) to about 300 nm and the distance "D2" is about 3 microns. The magnetic layer 302 may be a high moment magnetic layer such as CoFe. A nonmagnetic spacer layer 304 is deposited on and adjacent to the magnetic layer 302. The nonmagnetic spacer layer 304 has a first end 307 at the ABS and a second end 309 at the distance "D2" from the ABS. The nonmagnetic spacer layer 304 has a surface 308 that is coplanar with a surface 310 of the magnetic layer 302. The nonmagnetic spacer layer 304 may have a thickness of about 1 to 3 nm and may comprise Ru. A laminated stack 306 is disposed on at least a portion of the nonmagnetic layer 304. The laminated stack 306 may include a plurality of high moment magnetic layers with a thin nonmagnetic layer separating adjacent magnetic layers. In one embodiment, the laminated stack 306 includes a first high moment magnetic layer 402, a second high moment magnetic layer 406 and a nonmagnetic layer 404 disposed between the two magnetic layers 402, 406, as shown in FIG. 4. The high moment magnetic layers 402, 406 may comprise CoFe and the nonmagnetic layer 404 may comprise Cr.

As shown in FIG. 3A, the laminated stack 306 has a first end 311 at the ABS and a second end 313 at a distance "D3" from the ABS. The laminated stack 306 has a first portion that extends to the ABS that has a width "D4" and a second portion that is recessed from the ABS that has a width "D5". In one embodiment, the distance "D3" ranges from about 200 nm to about 400 nm, the width "D4" ranges from about 100 nm to about 200 nm and the width "D5" ranges from about 100 nm to about 200 nm. In one embodiment, the second end 313 of the laminated stack 306 extends farther away from the ABS and aligns with the end 309 of the nonmagnetic spacer layer and the end 305 of the magnetic layer.

Figure 3B:
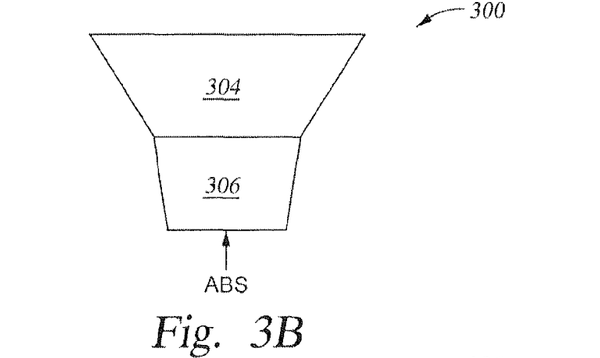

FIG. 3B is a top view of the main pole 300, which shows the laminated stack 306 extending to the ABS and a portion of the nonmagnetic layer 304 not covered by the laminated stack 306 that is recessed from the ABS. The main pole 300 as shown in FIGS. 3A and 3B has a laminated stack 306 at the ABS, which is effective in reducing pole erasure since pole erasure mostly occurs at the ABS. The laminated stack 306 and the magnetic layer 302 are separated by the nonmagnetic layer 304 to break the exchange coupling between the laminated stack 306 and the magnetic layer 302. In the embodiment where the laminated stack 306 only covers a portion of the nonmagnetic layer 304, the unlaminated portion that is recessed from the ABS, i.e., the portion of the magnetic layer 302 not covered by the laminated stack 306, helps improving the soft error rate performance and writing efficiency.

Figure 5A:
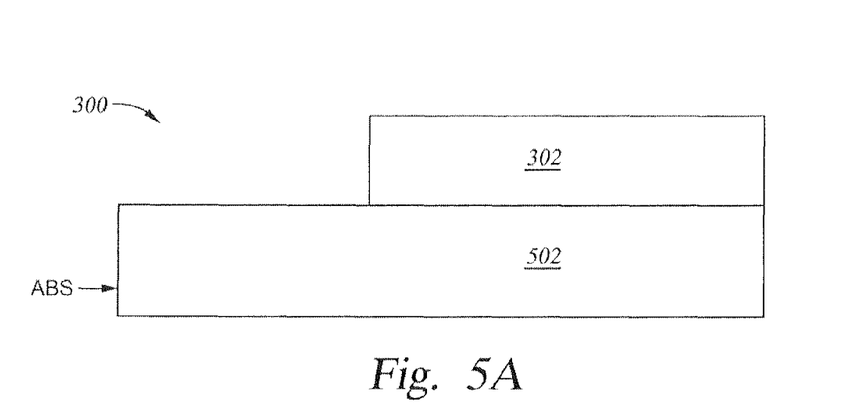
FIGS. 5A-5D illustrate a process of making the main pole according to one embodiment.

FIGS. 5A-5D illustrate the main pole 300 at different process stages according to one embodiment. As shown in FIG. 5A, the magnetic layer 302 is deposited on a substrate 502. The substrate 502 may include components of the read/write head 200 that have already been deposited thereon. As described above, the magnetic layer 302 does not extend to the ABS. The magnetic layer 302 may be deposited by any suitable deposition method, such as chemical vapor deposition (CVD), physical vapor deposition (PVD) or electroplating.

Figure 5B:
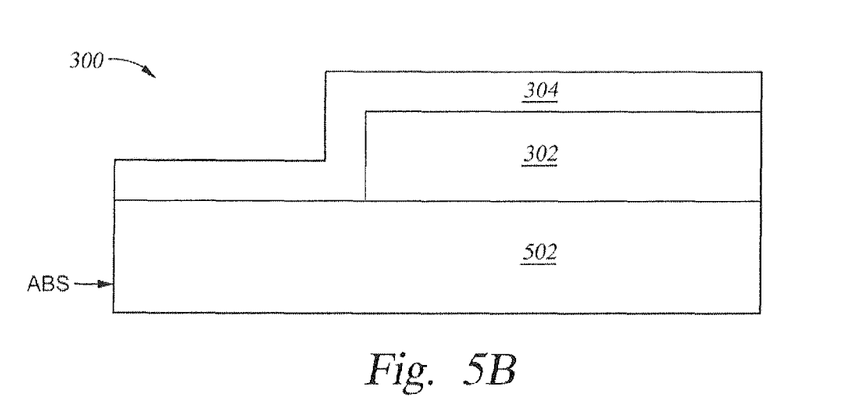
Figure 5C:
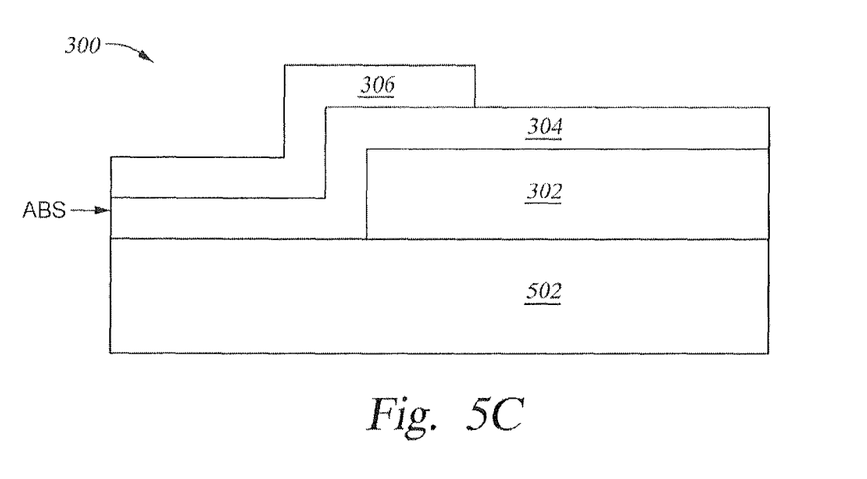
Figure 5D:
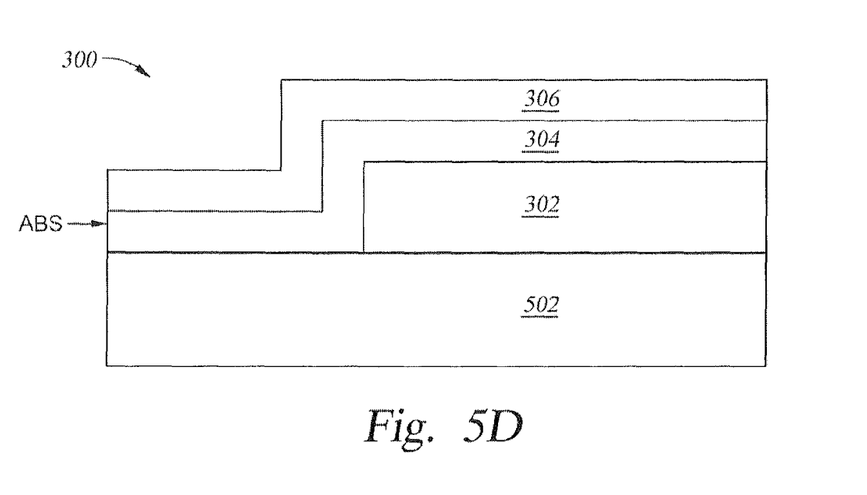

Next, as shown in FIG. 5B, the nonmagnetic spacer layer 304 is deposited on the substrate 502 and the magnetic layer 302. The nonmagnetic spacer layer 304 may be deposited by any suitable deposition method, such as CVD or PVD. The laminated stack 306 is then deposited on at least a portion of the nonmagnetic layer 304, as shown in FIG. 5C. The laminated stack 306 may be deposited on the entire top surface of the nonmagnetic layer 304, as shown in FIG. 5D. The laminated stack 306 may be deposited by a series of suitable deposition processes, such as CVD or PVD.

Figure 6A:
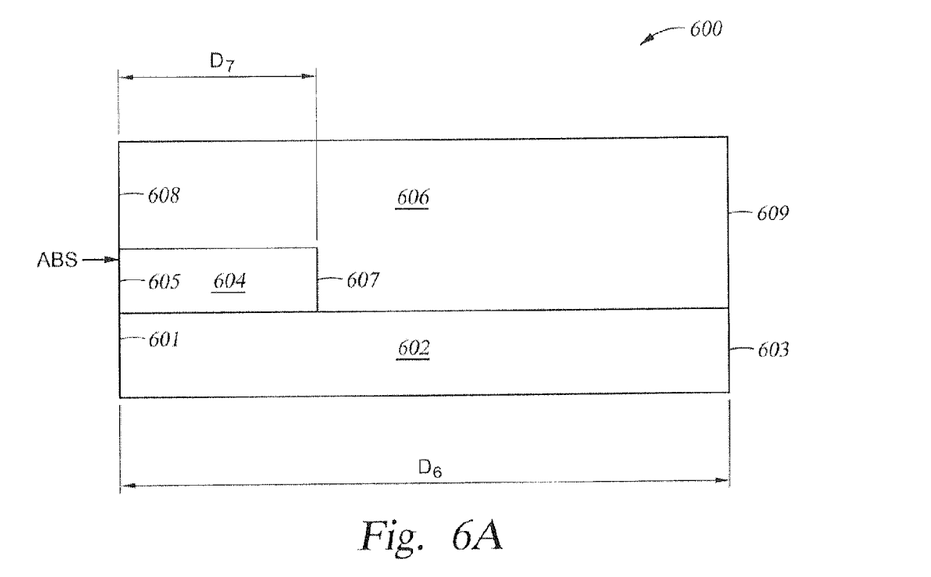
FIGS. 6A-6B show the main pole of the write head according to one embodiment.
Figure 6B:
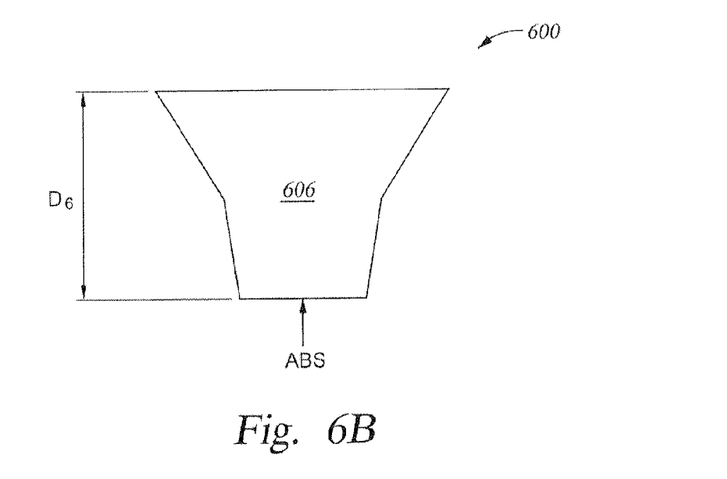

FIGS. 6A-6B show a main pole 600 according to another embodiment. The main pole 600 may be the main pole 220 in FIG. 2. As shown in FIG. 6A, the main pole 600 includes a first magnetic layer 602 that has a first end 601 at the ABS and a second end 603 at a distance "D6" from the ABS. The magnetic layer 602 may comprise the same material as the magnetic layer 302. In one embodiment, the distance "D6" is about 3 microns. A nonmagnetic spacer layer 604 is disposed on a portion of the first magnetic layer 602. The nonmagnetic spacer layer 604 has a first end 605 at the ABS and a second end 607 at a distance "D7" from the ABS. The nonmagnetic spacer layer 604 may comprise the same material as the nonmagnetic spacer layer 304. In one embodiment, the distance "D7" is about 50 nm to about 150 nm. A second magnetic layer 606 is disposed on the nonmagnetic spacer layer 604 and the portion of the first magnetic layer 602 not covered by the nonmagnetic spacer layer 604. The second magnetic layer 606 may comprise the same material as the first magnetic layer 602. The second magnetic layer 606 has a first end 608 at the ABS and a second end 609 at the distance "D6" from the ABS.

FIG. 6B is a top view of the main pole 600, which shows the second magnetic layer 606 extending from the ABS to a location that is the distance "D6" from the ABS. The main pole 600 has a laminated portion at the ABS, i.e., the nonmagnetic spacer layer 604 sandwiched between the first and second magnetic layers 602, 606, which helps reducing pole erasure at the ABS.

Figure 7A:
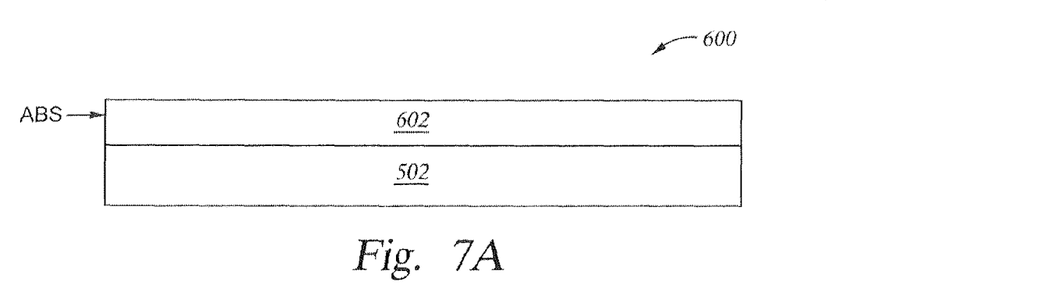
FIGS. 7A-7D illustrate a process of making the main pole according to one embodiment.
Figure 7B:
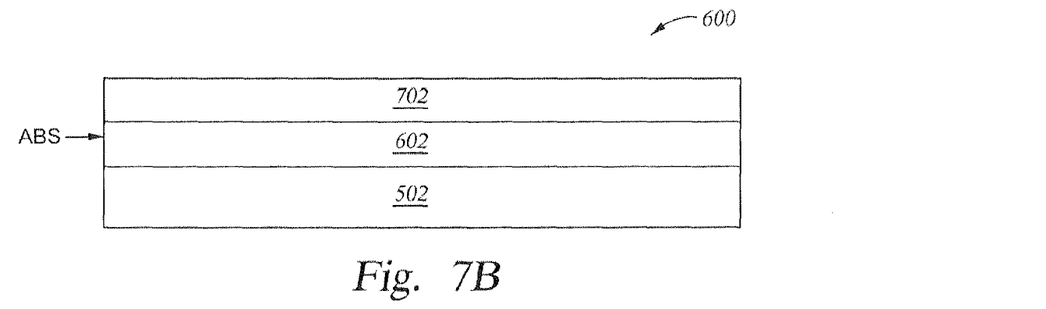

FIGS. 7A-7D illustrate the main pole 600 at different processing stages according to one embodiment. As shown in FIG. 7A, the first magnetic layer 602 is deposited on the substrate 502. The first magnetic layer 602 may be deposited by any suitable deposition method, such as CVD or PVD. Next, as shown in FIG. 7B, a nonmagnetic spacer layer 702 is deposited on the first magnetic layer 602. The nonmagnetic spacer layer 702 may be deposited by any suitable deposition method, such as CVD or PVD. A portion of the nonmagnetic spacer layer 702 that is recessed from the ABS is removed, leaving the nonmagnetic spacer layer 604, as shown in FIG.

Figure 7C:
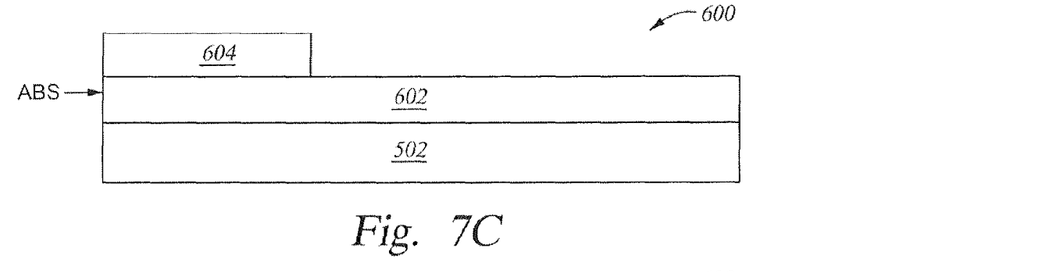
Figure 7D:
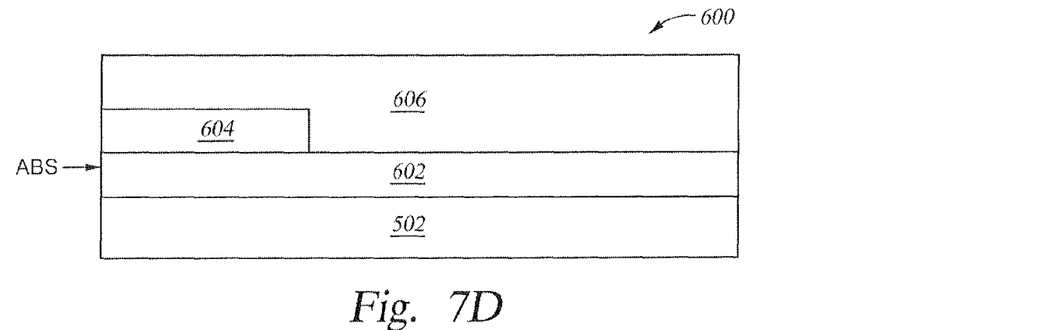

7C. The second magnetic layer 606 is then deposited on the nonmagnetic layer 604 and the portion of the first magnetic layer 602 that is not covered by the nonmagnetic layer 604, as shown in FIG. 7D. The second magnetic layer 606 may be deposited by any suitable deposition method, such as CVD or PVD.

In summary, a partially laminated main pole is disclosed. The main pole has a laminated stack disposed at the ABS and the laminated stack is disposed over at least a portion of a magnetic layer. A nonmagnetic spacer layer is sandwiched between the laminated stack and the magnetic layer to break the exchanging coupling between the laminated stack and the magnetic layer. The laminated stack at the ABS may reduce the pole erasure and the portion of the magnetic layer not cover by the laminated stack may help improve the soft error rate and write efficiency.

While the foregoing is directed to embodiments of the present invention, other and further embodiments of the invention may be devised without departing from the basic scope thereof, and the scope thereof is determined by the claims that follow.

What is claimed is:

1. A magnetic write head, comprising:
    a partially laminated main pole, including:
        a magnetic layer having a first end at a first distance from a media facing surface and a second end at a second distance from the media facing surface;
        a nonmagnetic layer disposed on and adjacent to the magnetic layer, wherein the nonmagnetic layer has a third end at the media facing surface and a fourth end at a third distance from the media facing surface; and
        a laminated stack disposed on at least a portion of the nonmagnetic layer, wherein the laminated stack has a fifth end at the media facing surface and a sixth end at a fourth distance from the media facing surface, wherein a portion of the nonmagnetic layer is disposed between the media facing surface and the first end of the magnetic layer.

2. The magnetic write head of claim 1, wherein the nonmagnetic layer includes a first surface and the magnetic layer includes a second surface, and wherein the first surface is coplanar with the second surface.

3. The magnetic write head of claim 1, wherein the magnetic layer includes CoFe.

4. The magnetic write head of claim 1, wherein the nonmagnetic layer includes Ru.

5. The magnetic write head of claim 1, wherein the laminated stack includes a first magnetic layer, a second magnetic layer and a second nonmagnetic layer sandwiched between the first and second magnetic layers.

6. The magnetic write head of claim 1, wherein the first distance is about 100 to about 300 nm.

7. A magnetic write head, comprising:
    a partially laminated main pole, including:
        a magnetic layer having a first end at a first distance from a media facing surface and a second end at a second distance from the media facing surface;
        a nonmagnetic layer disposed on and adjacent to the magnetic layer, wherein the nonmagnetic layer has a third end at the media facing surface and a fourth end at a third distance from the media facing surface; and
        a laminated stack disposed on at least a portion of the nonmagnetic layer, wherein the laminated stack has a fifth end at the media facing surface and a sixth end at a fourth distance from the media facing surface, wherein the laminated stack has a first portion and a second portion, wherein the first portion extends to the media facing surface and has a first width and the second portion is recessed from the media facing surface and has a second width, and wherein the first width and the second width range from about 100 nm to about 200 nm.

8. The magnetic write head of claim 7, wherein the nonmagnetic layer includes a first surface and the magnetic layer includes a second surface, and wherein the first surface is coplanar with the second surface.

9. The magnetic write head of claim 8, wherein the nonmagnetic layer includes Ru.

10. The magnetic write head of claim 9, wherein the magnetic layer includes CoFe.

11. The magnetic write head of claim 7, wherein the magnetic layer includes CoFe.

12. The magnetic write head of claim 11, wherein the laminated stack includes a first magnetic layer, a second magnetic layer and a second nonmagnetic layer sandwiched between the first and second magnetic layers, and wherein the nonmagnetic layer includes a first surface and the magnetic layer includes a second surface, and wherein the first surface is coplanar with the second surface.

13. The magnetic write head of claim 7, wherein the nonmagnetic layer includes Ru.

14. The magnetic write head of claim 13, wherein the laminated stack includes a first magnetic layer, a second magnetic layer and a second nonmagnetic layer sandwiched between the first and second magnetic layers, and wherein the nonmagnetic layer includes a first surface and the magnetic layer includes a second surface, and wherein the first surface is coplanar with the second surface.

15. The magnetic write head of claim 14, wherein the magnetic layer includes CoFe.

16. The magnetic write head of claim 7, wherein the laminated stack includes a first magnetic layer, a second magnetic layer and a second nonmagnetic layer sandwiched between the first and second magnetic layers.

17. A magnetic write head, comprising:
    a partially laminated main pole, including:
        a magnetic layer having a first end at a first distance from a media facing surface and a second end at a second distance from the media facing surface;
        a nonmagnetic layer disposed on and adjacent to the magnetic layer, wherein the nonmagnetic layer has a third end at the media facing surface and a fourth end at a third distance from the media facing surface; and
        a laminated stack disposed on at least a portion of the nonmagnetic layer, wherein the laminated stack has a fifth end at the media facing surface and a sixth end at a fourth distance from the media facing surface, wherein the magnetic layer includes a first surface and a second surface, wherein the nonmagnetic layer includes a third surface and a fourth surface, wherein the first surface is coplanar with the third surface and wherein the fourth surface is in contact with the second surface.

18. The magnetic write head of claim 17, wherein the magnetic layer includes CoFe.

19. The magnetic write head of claim 17, wherein the nonmagnetic layer includes Ru.

20. The magnetic write head of claim 17, wherein the laminated stack includes a first magnetic layer, a second magnetic layer and a second nonmagnetic layer sandwiched between the first and second magnetic layers.

* * * * *